(12) United States Patent
Choi et al.

(10) Patent No.: US 6,369,991 B1
(45) Date of Patent: Apr. 9, 2002

(54) HEAD DRUM APPARATUS

(75) Inventors: Do-Young Choi; Young-Ho Cho; Hyeong-Seok Choi; Chung-Hum Baik; Jun-Young Kim; Seung-Woo Lee; Sung-Hee Hong, all of Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/456,517

(22) Filed: Dec. 8, 1999

(30) Foreign Application Priority Data

Dec. 8, 1998 (KR) .............................. 98-24474

(51) Int. Cl.[7] .................................. G11B 5/52
(52) U.S. Cl. .................................. 360/271.7
(58) Field of Search ............................. 360/271.7, 272, 360/64, 68

(56) References Cited

U.S. PATENT DOCUMENTS 6,191,907 B1 * 2/2001 Wursthorn et al. ........... 360/64

\* cited by examiner

Primary Examiner—Allen Cao
(74) Attorney, Agent, or Firm—Staas & Halsey LLP (57) ABSTRACT

A head drum apparatus including a lower drum; a stationary shaft pressed and fitted into a center hole of the lower drum; an upper drum rotatably coupled to the stationary shaft via at least one bearing; a rotor magnet secured via a plate to the upper drum; a boss fixed to the top portion of the stationary shaft by a set-screw; a PCB mounted to the boss such that it is opposite to the rotor magnet, the PCB having a pulse generator ("PG") pattern, a frequency generator ("FG") pattern, connection patterns and jump patterns formed on one surface thereof, the PG pattern and the FG pattern being connected to the respective connection patterns via the respective jump patterns; and motor stator coils mounted to the PCB, whereby the structure of the motor becomes simpler, the number of the components and the manufacturing steps are reduced, the manufacturing efficiency is enhanced and the productivity thereof is increased.

17 Claims, 6 Drawing Sheets

HEAD DRUM APPARATUS

CROSS-REFERENCE TO RELATED APPLICATIONS

This application claims the benefit of Korean Utility Model Application Not. 98-24474, filed Dec. 8, 1998, in the Korean Patent Office, the disclosure of which is incorporated herein by reference.

BACKGROUND OF THE INVENTION

1. Field of the Invention

The present invention relates to a motor for rotating an upper drum, which is provided on a top surface of the upper drum and a top portion of a stationary shaft, in a head drum apparatus for use in a magnetic tape recording and reproducing apparatus; and, more particularly, to a head drum apparatus capable of reducing the number of components and the manufacturing steps by using a single surface printed circuit board ("PCB"), thereby decreasing the production cost, enhancing the manufacturing efficiency, and increasing the productivity thereof.

2. Description of the Related Art

Conventionally, a shaft-rotating type head drum apparatus has been employed in a magnetic tape recording and reproducing apparatus. In the shaft-rotating type head drum apparatus, a rotating shaft is pressed and fitted into an upper drum and a lower drum is rotatably mounted on a lower portion of the rotating shaft. A motor is attached to the bottom surface of the lower drum and activated to rotate the shaft and hence the upper drum. A head provided in the upper drum records or reproduces a signal to or from a magnetic tape.

However, the head drum apparatus of the shaft-rotating type has two freedom degrees and does not fully overcome resonant vibration problems, so that it cannot remove the likelihood of its malfunction due to the resonant vibration upon the rotation of the upper drum.

Recently, in order to solve the above problems, a shaft-fixed type head drum apparatus has been proposed. The typical constitution of the shaft-fixed type head drum assembly will now be described.

Figure 1:
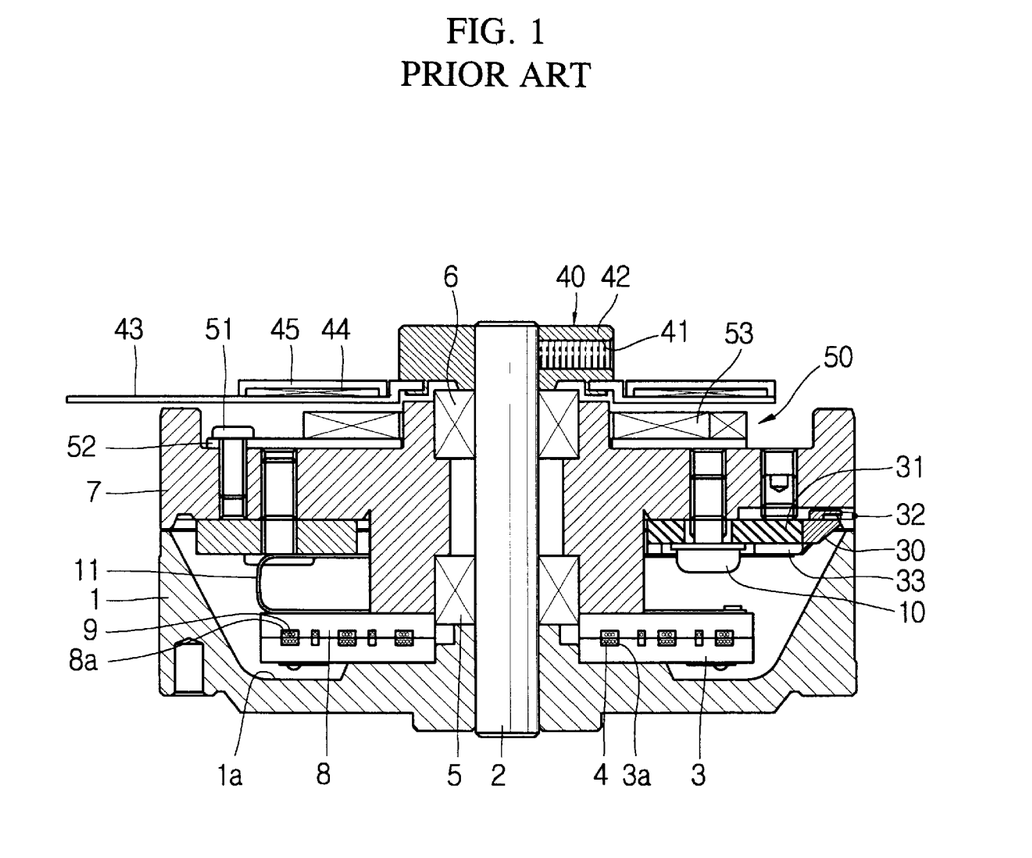
FIG. 1 is a cross-sectional view of a conventional shaft-fixed type head drum apparatus.
Figure 2:
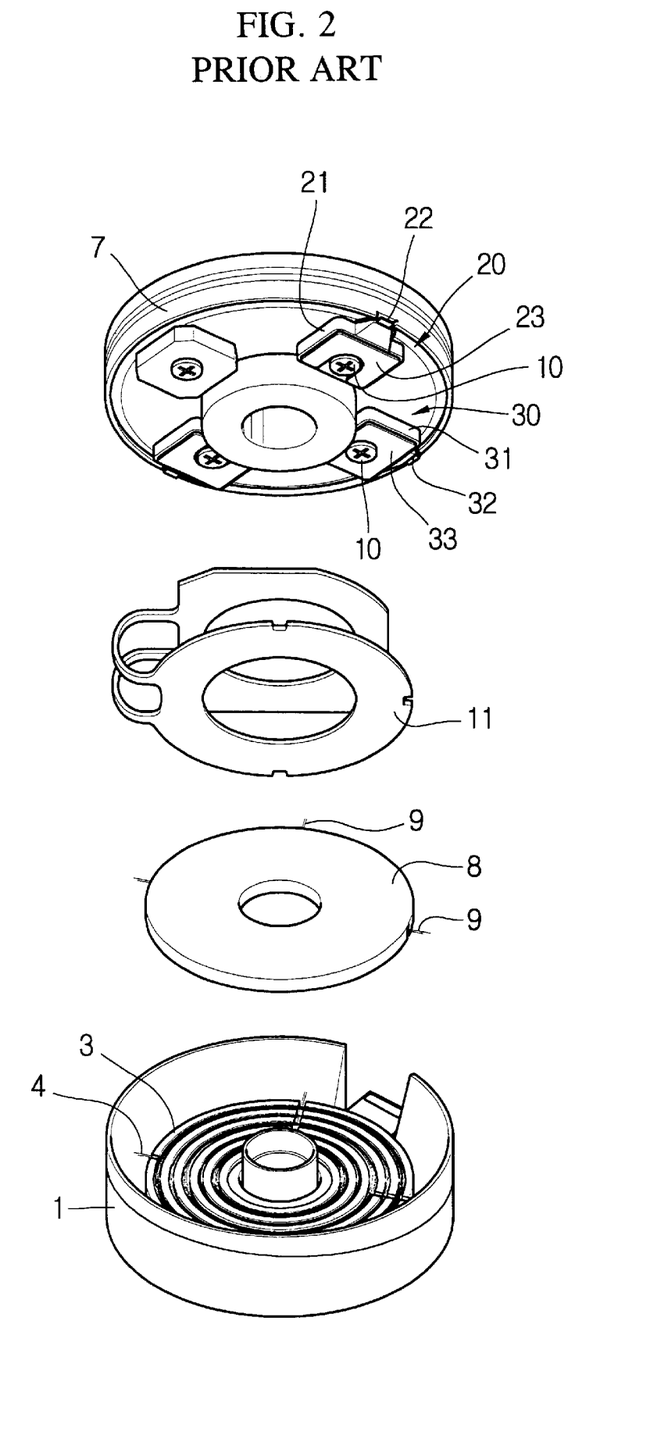
FIG. 2 is an exploded perspective view of the conventional shaft-fixed type head drum apparatus.

As shown in FIGS. 1 and 2, a general shaft-fixed type head drum apparatus of a magnetic tape recording and reproducing apparatus comprises: a lower drum 1 having a recessed portion 1a formed therein, a stationary shaft 2 pressed and fitted into a center hole of the lower drum 1, a stationary transformer 3 attached to the bottom surface of the lower drum 1, the stationary transformer 3 having a plurality of concentric channels 3a formed on the top surface thereof, a plurality of stator coils 4 wound in the respective channels 3a, an upper drum 7 rotatably coupled to the stationary shaft 2 via bearings 5 and 6 fixed on a middle portion and an upper portion of the stationary shaft 2, respectively, a rotary transformer 8 attached to a bottom surface of the upper drum 7 such that a gap is formed between the rotary and the stationary transformers 8 and 3, the rotary transformer 8 having a plurality of concentric channels 8a on the bottom surface thereof, a plurality of lines of rotor coils 9 wound in the respective channels 8a of the rotary transformer 8, a head assembly 20 and a full-width erasing head assembly 30 fixed to the bottom surface of the upper drum 7 by means of screws 10, a signal transmitting means for transmitting the signals between the rotor coils 9 of the rotary transformer 8 and the head assembly 20 and the full-width head assembly 30, and a drum motor provided on the top portion of the stationary shaft 2 and the top surface of the upper drum 7.

The signal transmitting means uses a flexible printed circuit ("FPC") 11. Mounted to a portion of the pattern formed on the FPC is a ceramic condenser (hereinafter referred to as "chip") which acts as a filter tuning the frequency band within the band of a full-width erasing head 32.

The head assembly 20 and the full-width erasing head assembly 30 are provided with a video head 22 and the full-width erasing head 32 on the leading ends of head bases 21 and 31, respectively. The head assembly 20 and the full-width erasing head assembly 30 also have PCBs 23 and 33 with desired patterns on the bottom surfaces thereof, respectively. The video head 22 and the full-width erasing head 32 are electrically connected to the PCBs 23 and 33, respectively.

On the other hand, the drum motor includes a motor stator 40 fixed to the top portion of the stationary shaft 2 and a motor rotor 50 fixed to the top surface of the upper drum 7.

Figure 3:
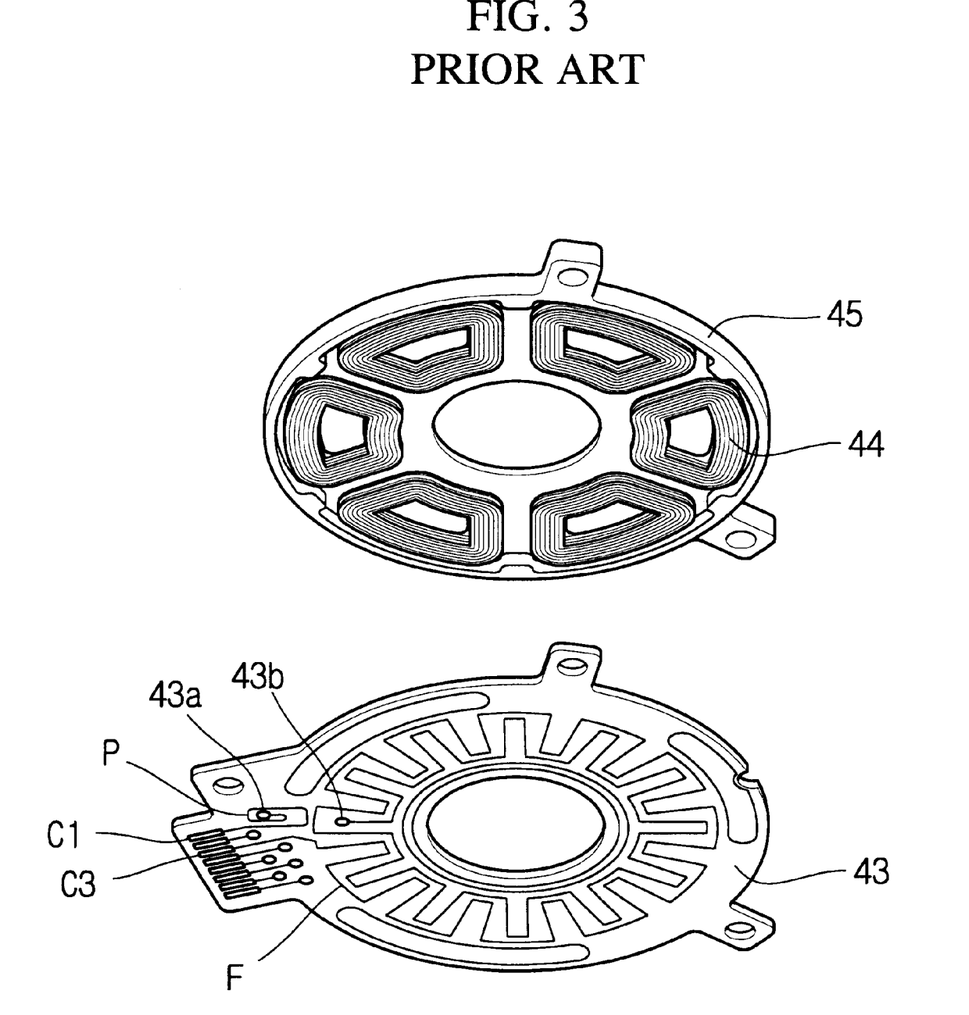
FIG. 3 is an exploded perspective view of the motor stator of the conventional head drum apparatus.

Specifically, the motor stator 40 is fitted on the top portion of the stationary shaft 2 and includes a boss 42 into which a set screw 41 is radially screwed, a PCB 43 secured to the bottom surface of the boss 42, motor stator coils 44 mounted on the top surface of the PCB 43, and a back yoke 45 mounted on the PCB 43 to cover the motor stator coils 44. The motor rotor 50 includes a plate 52 fixed to the top surface of the upper drum 7 by means of a plurality of screws 51 and a motor magnet 53 attached to the upper surface of the plate 52.

Figure 4:
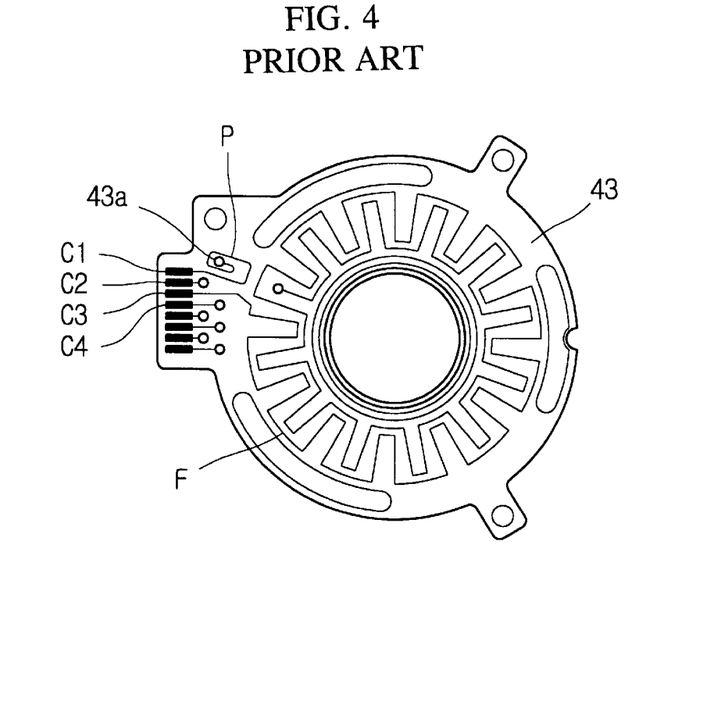
FIG. 4 is a bottom view of the PCB of the motor stator of the conventional head drum apparatus.
Figure 5:
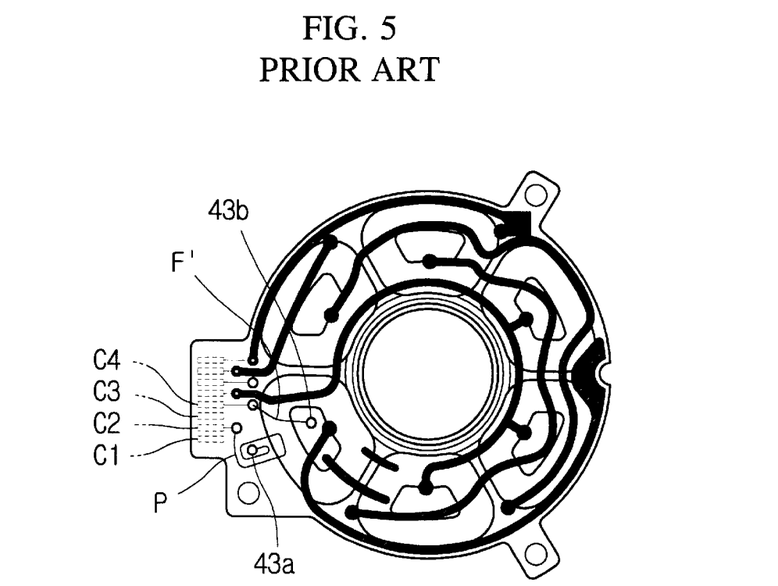
FIG. 5 is a top view of the PCB of the motor stator of the conventional head drum apparatus.

Formed on the bottom surface of the PCB 43 are a pulse generator("PG") pattern P for controlling the position of the video head 22 mounted to the upper drum 7 and a frequency generator("FG") pattern F for performing a regional control as a detail control of the PG pattern P, as shown in FIGS. 3 to 5.

The FG pattern F has a wave form which is circumferentially disposed around the center thereof and has two lines, an inner line and an outer line. The PG pattern P is located at a portion on one side of the FG pattern F.

In order to connect a connection pattern C1 and C3 formed one surface of the PCB 43 with a connection pattern C2 and C4 formed on the other surface, it is necessary to form an another FG pattern F' and an another PG pattern P' on the top surface of the PCB 43, which is opposite to the bottom surface on which the FG pattern F and the PG pattern P are formed. The FG patterns F and F' are connected to each other through a through hole 43a and the PG patterns P and P' are connected to each other through a through hole 43b. The terminals of the FG pattern F' and the PG pattern P' are connected to the connection patterns C2 and C4, respectively.

In the above conventional shaft-fixed type head drum apparatus, the upper drum 7 is rotated by an electromagnetic activation of the drum motor provided at the top portion of the stationary shaft 2 and the top portion of the upper drum 7, the head 22 of the upper drum 7 reproduces or records the signals from or to a tape (not shown) traveling around the outer peripheral surfaces of the upper and the lower drums 7 and 1, and the full-width erasing head 32 erases the information (signals) recorded on the tape.

On the other hand, the signals from the head 22 and the full-width erasing head 32 are transmitted through in turn the FPC 11 connected to the respective PCBs 23 and 32, the rotor coils 9 of the rotary transformer 8 and the stator coil 4 of the stationary transformer 3, to a controller (not shown) or vice versa.

At this time, since the PG patterns P and P' and the FG patterns F and F' are formed on the PCB 43 of the motor stator 40, a motor servo function for controlling the position and section of the upper drum 7 is performed.

However, in the conventional shaft-fixed type head drum apparatus described above, the PCB having both surfaces of which the PG patterns P and P' and the FG patterns F and F' are formed is employed, and it is difficult to manufacture the bisurface PCB, thereby resulting in an increased production cost due to the need for the additional back yoke 45, a decreased operation efficiency and a poor productivity thereof.

SUMMARY OF THE INVENTION

It is, therefore, an object of the present invention to provide a motor of a head drum apparatus capable of reducing a number of components and manufacturing steps by using monosurface printed circuit board ("PCB") thereby decreasing the production cost, enhancing the manufacturing efficiency and increasing the productivity thereof.

Additional objects and advantages of the invention will be set forth in part in the description which follows and, in part, will be obvious from the description, or may be learned by practice of the invention.

In accordance with the present invention, there is provided a head drum apparatus comprising: a lower drum; a stationary shaft pressed and fitted into a center hole of the lower drum; an upper drum rotatably coupled to the stationary shaft via at least one bearing; a rotor magnet secured via a plate to the upper drum; a boss fixed to the top portion of the stationary shaft by means of a set-screw; a PCB mounted to the boss such that it is opposite to the rotor magnet, the PCB having a PG pattern, an FG pattern, connection patterns and jump patterns formed on one surface thereof, the PG pattern and the FG pattern being connected to the respective connection patterns via the respective jump patterns; and motor stator coils mounted to the PCB.

Preferably, the motor stator coils are mounted to the patterns such that they are opposite to the rotor magnet.

BRIEF DESCRIPTION OF THE DRAWINGS

The above and other objects and features of the present invention will become apparent from the following description of preferred embodiments when taken in conjunction with the accompanying drawings, in which.

DESCRIPTION OF THE PREFERRED EMBODIMENT

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 6:
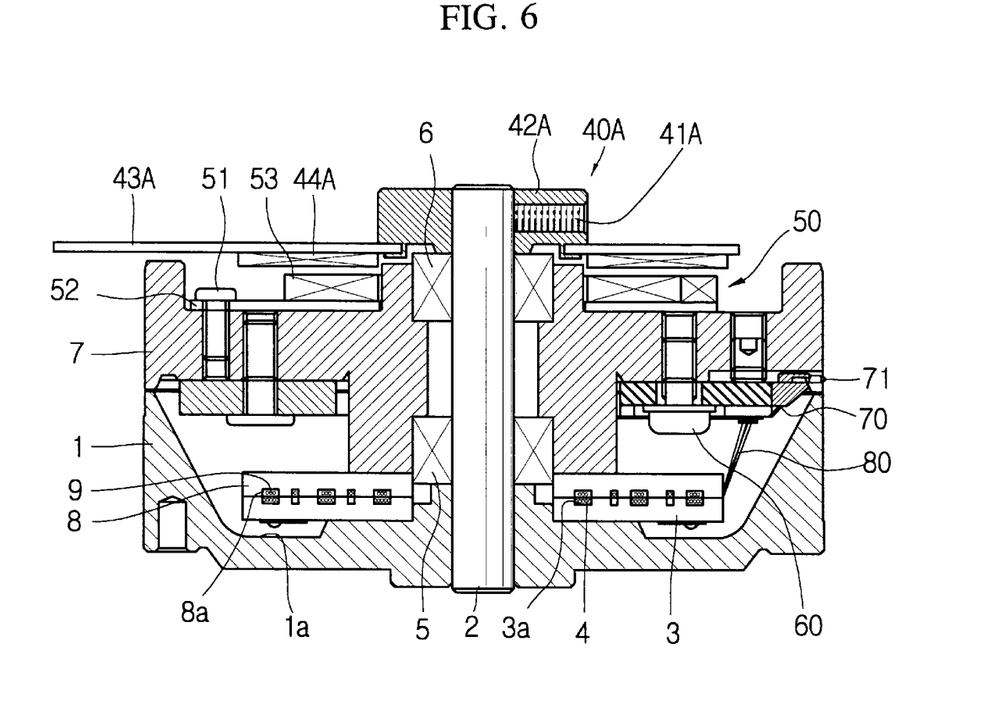
FIG. 6 is a cross-sectional view of a head drum apparatus of a magnetic tape recording and reproducing apparatus according to an embodiment of the present invention.
Figure 7:
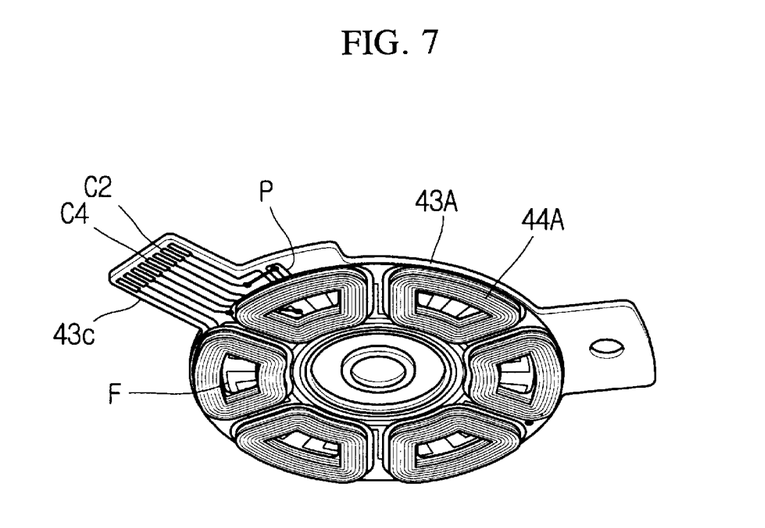
FIG. 7 is a perspective view of a motor stator of the head drum apparatus according to the embodiment of the present invention.
Figure 8:
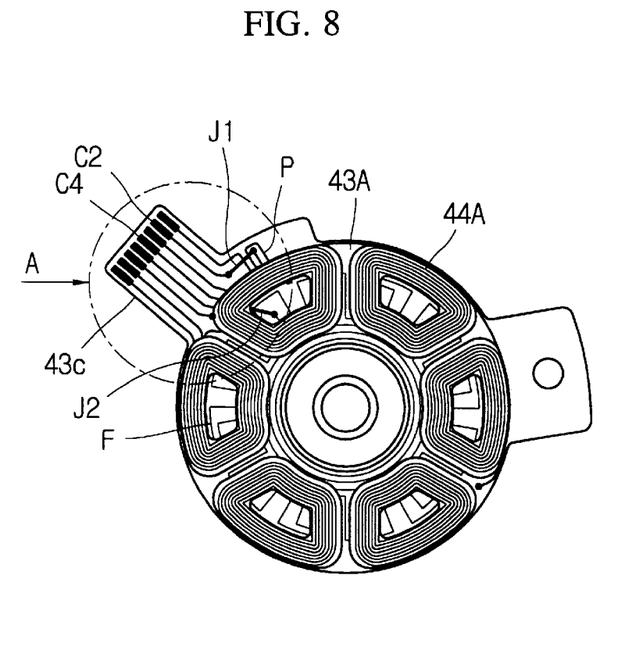
FIG. 8 is a bottom view of the motor stator of the head drum apparatus according to the embodiment of the present invention.
Figure 9:
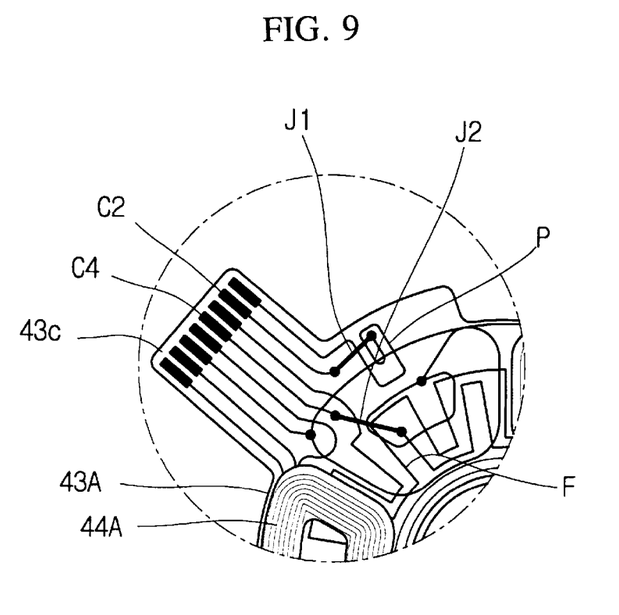
FIG. 9 is a detailed fragmentary view of a portion "A" shown in FIG. 8.

FIG. 6 is a cross-sectional view of a head drum apparatus of a magnetic tape recording and reproducing apparatus according to an embodiment of the present invention; FIG. 7 is a perspective view of the motor stator of the head drum apparatus according to the embodiment of the present invention; FIG. 8 is a bottom view of the motor stator of the head drum apparatus according to the embodiment of the present invention; and FIG. 9 is a detailed fragmentary view of the portion "A" shown in FIG. 8.

As shown in the drawings, the shaft-fixed type head drum apparatus according to the embodiment of the present invention comprises: a lower drum 1 having a recessed portion 1a formed therein, a stationary shaft 2 pressed and fitted into a center hole of the lower drum 1, a stationary transformer 3 attached to the bottom surface of the lower drum 1, the stationary transformer 3 having a plurality of concentric channels 3a formed on the top surface thereof, a plurality of stator coils 4 wound in the respective channels 3a, an upper drum 7 rotatably coupled to the stationary shaft 2 via bearings 5 and 6 fixed on a middle portion and an upper portion of the stationary shaft 2, respectively, a rotary transformer 8 attached to the bottom surface of the upper drum 7 such that a gap is formed between the rotary transformer 8 and the stationary transformer 3, the rotary transformer 8 having a plurality of concentric channels 8a formed on the bottom surface thereof, a plurality of lines of rotor coils 9 wound in the respective channels 8a of the rotary transformer 8, a plurality of head assemblies 70 fixed to the bottom surface of the upper drum 7 by means of screws 10, a signal transmitting means for transmitting the signals between the rotor coils 9 of the rotary transformer 8 and the head assemblies 70, and a drum motor provided on the top portion of the stationary shaft 2 and the top surface of the upper drum 7.

The signal transmitting means uses a flexible printed circuit ("FPC") 80. Mounted to a portion of the pattern formed on the FPC 80 is a ceramic condenser (hereinafter referred to as "chip") which acts as a filter tuning the frequency band within the band of the full- width erasing head.

The drum motor includes a motor stator 40A fixed to the top portion of the stationary shaft 2 and a motor rotor 50 fixed to the top surface of the upper drum 7. Similar to the conventional shaft-fixed type head drum apparatus, the motor rotor 50 is provided with a plate 52 secured to the top surface of the upper drum 7 by using screws 51 and a motor magnet 53 is attached to the upper surface of the plate 52.

The feature of the motor stator 40A of the drum motor of the head drum apparatus according to the embodiment of the present invention will now be described in detail.

The motor stator 40A of the drum motor according to the embodiment of the present invention, as shown in the drawings, includes a boss 42A secured to the top portion of the stationary shaft 2 by means of a set screw 41A which is radially screwed into the boss 42A; a monosurface PCB 43A secured to the boss 42A such that it is opposite to the motor magnet 53, the monosurface PCB 43A having one side provided with a PG pattern P, an FG pattern F and connection patterns C2 and C4 connected to the PG and the FG patterns, respectively, using jump patterns J1 and J2; and motor stator coils 44A mounted on the side of the single side PCB 43A.

In other words, the motor stator coils 44A are mounted on one surface of the monosurface PCB 43A, and the PG pattern P, the FG pattern F and the connection patterns C2 and C4 are formed on the same surface as well. Further, the PG pattern P and the FG pattern F are connected to the connection patterns C2 and C4 via the jump patterns J1 and J2, respectively. The jump patterns J1 and J2 are also referred to as a silver pattern.

More specifically, the PG pattern P and the FG pattern F, each of which has a typical shape, are formed on one side of the monosurface PCB 43A, and the several desired patterns such as the connection patterns C2 and C4 formed on a connection portion 43c protruding from a portion of the peripheral portion of the PCB 43A, are formed on the same surface of the monosurface PCB 43A. The PG pattern P and the FG pattern F are then connected to the connection patterns C2 and C4 using the jump patterns J1 and J2, respectively.

Furthermore, the motor stator coils 44A are preferably mounted to the bottom surface of the PCB 43A on which the PG pattern P and the FG pattern F are formed.

In the motor of the head drum apparatus according to the embodiment of the present invention, the PG pattern P and the FG pattern F are formed on the bottom surface of the monosurface PCB 43A, the terminals thereof being connected to the connection patterns C2 and C4 using the jump patterns J1 and J2, respectively, and the motor stator coils 44 are mounted to the bottom surface of the PCB 43A, thereby making the structure of the motor stator 40A simple.

In the head drum apparatus comprising the motor of the present invention as constructed above, when the upper drum 7 is rotated by an electromagnetic activation of the drum motor provided on the top portion of the stationary shaft 2 and the top portion of the upper drum 7, the video head (not shown) of the upper drum 7 reproduces or records the signals from or to a tape traveling around the outer peripheral surfaces of the upper drum 7 and the lower drum 1, and the full-width erasing head 71 erases the signals recorded on the tape.

On the other hand, the signals from the video head and the full-width erasing head 71 are transmitted through in turn the rotor coils 9 of the rotary transformer 8 and the stator coils 4 of the stationary transformer 3 to a controller (not shown) or vice versa.

At this time, since the PG pattern P and the FG pattern F are formed on the monosurface PCB 43 of the motor stator 40A, a motor servo function for controlling the position and section of the upper drum 7 is performed.

According to the head drum apparatus of the present invention, since the PG pattern and the FG pattern are formed and connected to the connection patterns via the jump patterns, respectively, on the same surface of the PCB, the structure of the motor becomes simpler, the number of components and the manufacturing steps are reduced, thereby decreasing the production cost, enhancing the manufacturing efficiency and increasing the productivity thereof.

Although the invention has been shown and described with respect to the preferred embodiment, it will be understood by those skilled in the art that various changes and modifications may be made without departing from the spirit and the scope of the invention as defined in the following claims.

What is claimed is:

1. A head drum apparatus comprising:
   a lower drum having a center hole;
   a stationary shaft pressed and fitted into the center hole of the lower drum;
   an upper drum rotatably coupled to the stationary shaft;
   a rotor magnet secured to the upper drum;
   a boss fixed to an end portion of the stationary shaft;
   a printed circuit board (PCB) mounted to the boss so as to be opposite to the rotor magnet, the PCB having a pulse generator (PG) pattern, a frequency generator (FG) pattern, connection patterns and jump patterns formed on one surface thereof, the PG pattern and the FG pattern being connected to the respective connection patterns via the respective jump patterns; and
   motor stator coils mounted to the PCB.

2. The head drum apparatus according to claim 1, wherein the motor stator coils are mounted to the PG and FG patterns such that they are opposite to the rotor magnet.

3. The head drum apparatus according to claim 1, where the motor stator coils are mounted to the one surface of the PCB.

4. The head drum apparatus according to claim 1, wherein the PG and FG patterns are on a first side of the motor stator coils and the rotor magnet is on a second side of the motor stator coils.

5. A head drum apparatus of a video tape and/or recording device, comprising:
   a first drum;
   a stationary shaft attached to the first drum;
   a second drum rotatably coupled to the stationary shaft and adjacent to the first drum, the second drum having a video head assembly and an erasing head assembly;
   a rotor magnet attached to the second drum;
   a printed circuit board (PCB) which is stationary relative to the second drum and opposite to the rotor magnet, the PCB having a pulse generator (PG) pattern and a frequency generator pattern (FG) formed on only one side surface of the PCB; and
   motor stator coils to interact with the rotor magnet to rotate the second drum.

6. The head drum apparatus according to claim 5, wherein the motor stator coils are mounted on the PCB.

7. The head drum apparatus according to claim 5, wherein the motor stator coils are mounted on the side surface of the PCB.

8. The head drum apparatus according to claim 5, wherein the motor stator coils are mounted on the side surface of the PCB so that the PG and FG patterns on a first side of the motor stator coils and the rotor magnet is on a second side of the motor stator coils.

9. The head drum apparatus according to claim 5, wherein the PCB further comprises connection patterns and jump patterns formed on the side surface, the PG and FG patterns being connected to respective ones of the connection patterns via respective ones of the jump patterns.

10. The head drum apparatus according to claim 7, wherein the PCB further comprises connection patterns and jump patterns formed on the side surface, the PG and FG patterns being connected to respective ones of the connection patterns via respective ones of the jump patterns.

11. The head drum apparatus according to claim 8, wherein the PCB further comprises connection patterns and jump patterns formed on the side surface, the PG and FG patterns being connected to respective ones of the connection patterns via respective ones of the jump patterns.

12. The head drum apparatus according to claim 5, further comprising a boss fixed to an end portion of the stationary shaft, and on which the PCB is mounted.

13. The head drum apparatus according to claim 5, wherein the FG pattern has a waveform shape circumferentially disposed about a center of the PCB and has inner and outer lines, and the PG pattern is located at a side of the FG pattern.

14. The head drum apparatus according to claim 7, wherein the motor stator coils are mounted on the side surface of the PCB and over the FG pattern.

15. The head drum apparatus according to claim 8, wherein the motor stator coils are mounted on the side surface of the PCB and over the FG pattern.

16. A head drum apparatus of a video tape and/or recording device, comprising:

a first drum;

a stationary shaft attached to the first drum;

a second drum rotatably coupled to the stationary shaft and adjacent to the first drum, the second drum having a video head assembly and an erasing head assembly;

a rotor magnet attached to the second drum;

a printed circuit board (PCB) which is stationary relative to the second drum and opposite to the rotor magnet, the PCB having a pulse generator (PG) pattern and a frequency generator pattern (FG) formed on a side surface of the PCB; and motor stator coils mounted on the side surface of the PCB and opposite the rotor magnet, to interact with the rotor magnet to rotate the second drum.

17. The head drum apparatus according to claim 16, wherein the PCB further comprises connection patterns and jump patterns formed on the side surface, the PG and FG patterns being connected to respective ones of the connection patterns via respective ones of the jump patterns.

* * * * *